(12) United States Patent
Bogdan et al.

(10) Patent No.: US 9,708,454 B2
(45) Date of Patent: *Jul. 18, 2017

(54) MIXTURES CONTAINING 1,1,1,4,4,4-HEXAFLUOROBUTENE AND 1-CHLORO-3,3,3-TRIFLUOROPROPENE

(71) Applicant: HONEYWELL INTERNATIONAL INC., Morristown, NJ (US)

(72) Inventors: Mary C Bogdan, Buffalo, NY (US); Clifford p. Gittere, Amherst, NY (US); James M. Bowman, Geneva, IL (US); Yiu Keung Ling, Amherst, NY (US); David J. Williams, East Amherst, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,222

(22) Filed: Sep. 28, 2015

(65) Prior Publication Data

US 2016/0090461 A1    Mar. 31, 2016

Related U.S. Application Data

(62) Division of application No. 13/276,369, filed on Oct. 19, 2011, now Pat. No. 9,145,480.

(60) Provisional application No. 61/407,708, filed on Oct. 28, 2010.

(51) Int. Cl.
*C08J 9/14* (2006.01)
*C08G 18/08* (2006.01)
*C08G 18/32* (2006.01)
*C08G 18/42* (2006.01)
*C08G 18/48* (2006.01)
*C08G 18/76* (2006.01)

(52) U.S. Cl.
CPC ............. *C08J 9/144* (2013.01); *C08G 18/14* (2013.01); *C08G 18/3206* (2013.01); *C08G 18/4208* (2013.01); *C08G 18/48* (2013.01); *C08G 18/7671* (2013.01); *C08J 9/146* (2013.01); *C08J 9/149* (2013.01); *C08J 2203/142* (2013.01); *C08J 2203/162* (2013.01); *C08J 2203/182* (2013.01); *C08J 2203/202* (2013.01); *C08J 2371/10* (2013.01); *C08J 2375/04* (2013.01); *C08J 2375/08* (2013.01)

(58) Field of Classification Search
CPC ............ C08J 2203/142; C08J 2203/162; C08J 2203/182; C08J 2203/202; C08J 2375/04; C08J 9/149
See application file for complete search history.

(56) References Cited

U.S. PATENT DOCUMENTS 9,145,480 B2 * 9/2015 Bogdan .................. C08J 9/149
2011/0124756 A1 * 5/2011 Singh .................. C08G 18/1808
521/131

FOREIGN PATENT DOCUMENTS

WO    2010/141527    * 12/2010

* cited by examiner

*Primary Examiner* — John Cooney
(74) *Attorney, Agent, or Firm* — Colleen D. Szuch

(57) ABSTRACT

The present invention relates to mixtures of 1,1,1,4,4,4-hexafluorobutene (1336mzzm) and 1-chloro-3,3,3-trifluoropropene (1233zd). The blends are useful as blowing agents for polymer foam, solvents, aerosol propellants and heat transfer media.

18 Claims, 4 Drawing Sheets

MIXTURES CONTAINING 1,1,1,4,4,4-HEXAFLUOROBUTENE AND 1-CHLORO-3,3,3-TRIFLUOROPROPENE

CROSS REFERENCES TO RELATED APPLICATIONS

This application is related to and claims the priority benefit of U.S. provisional application No. 61/407,708 filed Oct. 28, 2010, the contents of which are incorporated herein by reference.

FIELD OF THE INVENTION

The present invention relates to mixtures of 1,1,1,4,4,4-hexafluorobutene (1336mzzm) and 1-chloro-3,3,3-trifluoropropene (1233zd). More particularly, the present invention relates to blowing agent compositions containing 1,1,1,4,4,4-hexafluorobutene and 1-chloro-3,3,3-trifluoropropene.

BACKGROUND OF THE INVENTION

The class of foams known as low density rigid polyurethane or polyisocyanurate foam has utility in a wide variety of insulation applications including roofing systems, building panels, refrigerators and freezers. A critical factor in the large-scale commercial acceptance of rigid polyurethane foams in the building insulation industry has been their ability to provide a good balance of properties. Rigid polyurethane and polyisocyanurate foams are known to provide outstanding thermal insulation, excellent fire properties and superior structural properties at reasonably low densities.

The methods of producing polyurethane and polyisocyanurate foams are known and consist in general of the reaction of an organic polyisocyanurate (including diisocyanate) and a polyol or mixture of polyols in the presence of a volatile blowing agent, which is caused to vaporize by the heat liberated during the reaction of isocyanate and polyol. This reaction can be enhanced through the use of amine and/or other catalysts as well as surfactants. The catalysts ensure adequate curing of the foam, while the surfactants regulate and control cell size. Flame-retardants are traditionally added to rigid polyurethane or polyisocyanurate foam to reduce its flammability.

The foam industry has historically used liquid fluorocarbon blowing agents such as trichlorofluoromethane (CFC-11) and 1,1-dichloro-1-fluoroethane (HCFC-141b) because of ease of use in processing conditions. Fluorocarbons act not only as blowing agents by virtue of their volatility, but also are encapsulated or entrained in the closed cell structure of the rigid foam and are the major contributor to the low thermal conductivity properties of rigid urethane foams.

The use of a fluorocarbon as the preferred commercial expansion or blowing agent in insulating foam applications is based in part on the resulting k-factor associated with the foam produced. K-factor is defined as the rate of transfer of heat energy by conduction through one square foot of one inch thick homogenous material in one hour where there is a difference of one degree Fahrenheit perpendicularly across the two surfaces of the material. Since the utility of closed-cell polyurethane-type foams is based, in part, upon their thermal insulation properties, it would be advantageous to identify materials that produce lower k-factor foams than those above.

Many such blowing agents currently used for thermoset foams (PUR/PIR/Phenolic) also suffer from environmental or performance disadvantages. Concern has increased in recent years about potential damage to the earth's atmosphere and climate, and certain chlorine-based compounds have been identified as particularly problematic in this regard. The use of chlorine-containing compositions (such as chlorofluorocarbons (CFCs), hydrochlorofluorocarbons (HCFCs) and the like) has become generally disfavored because of the ozone-depleting properties associated with many of such compounds. There has thus been an increasing need for new fluorocarbon and hydrofluorocarbon compounds and blends of existing compositions that offer alternatives for foaming applications. Blowing agents with above atmospheric boiling points characteristically have poor low temperature thermal performance. Thus, ideal blowing agents or agent blends should be a LGWP material that has optimal performance over a wide temperature range.

Hydrohaloolefins like 1,1,1,4,4,4-hexafluorobutene (1336mzzm) and 1-chloro-3,3,3-trifluoropropene (1233zd) are being independently developed as stand alone agents to meet these requirements. One problem associated with 1336mzzm, however, is that it has an elevated boiling point and contains 6 fluorine atoms in its structure. Thus, by itself, it exhibits several of the foregoing disadvantages, which makes it less valuable and cost prohibitive as an agent.

Accordingly, blowing agents are desirable in the art that exhibit low k-factor values, low global warming potential, low molecular weight, cost effective and optimal performance over a wide temperature range. The present invention addresses each of the foregoing in the embodiments and examples provided herein.

SUMMARY OF THE INVENTION

The invention relates to mixtures comprising, consisting essentially of or consisting of 1,1,1,4,4,4-hexafluorobutene (1336mzzm) and 1-chloro-3,3,3-trifluoropropene (1233zd). In certain aspects, the compositions comprise from about 5 to about 70 mole percent 1,1,1,4,4,4-hexafluorobutene and from about 30 to about 95 mole percent 1-chloro-3,3,3-trifluoropropene. The compositions may also comprise from about 30 to about 70 mole percent 1,1,1,4,4,4-hexafluorobutene and from about 30 to about 70 mole percent 1-chloro-3,3,3-trifluoropropene. In further embodiments, the compositions comprise from about 40 to about 60 mole percent 1,1,1,4,4,4-hexafluorobutene and from about 40 to about 60 mole percent 1-chloro-3,3,3-trifluoropropene. In even further embodiments, the compositions comprise about 50 mole percent 1,1,1,4,4,4-hexafluorobutene and about 50 mole percent 1-chloro-3,3,3-trifluoropropene.

Accordingly, and in one embodiment, the present invention relates to blowing agent compositions including 1,1,1,4,4,4-hexafluorobutene (1336mzzm); 1-chloro-3,3,3-trifluoropropene (1233zd); and, optionally, at least one adjuvant selected from the group consisting of co-blowing agent(s), polyol(s), surfactant(s), polymer modifier(s), colorant(s), dye(s), solubility enhancer(s), flammability suppressant(s), flame retardants(s), antibacterial agent(s), viscosity reduction modifier(s), filler(s), vapor pressure modifier(s), nucleating agent(s), catalyst(s) and combination of any two or more of these.

1,1,1,4,4,4-hexafluorobutene may be provided in any effective amount to achieve the desired effects discussed herein. In one embodiment, such an effective amount is from about 5 to about 70 mole percent. In further embodiments, such an effective amount is from about 30 to about 70 mole percent; from about 40 to about 60 mole percent; or about 50 mole percent. While 1,1,1,4,4,4-hexafluorobutene may be provided as any isomer or mixtures of isomers, as defined herein, in one embodiment the composition includes at least the cis isomer of 1336mzzm, which may be provided alone or in a mixture with the trans isomer. To this end, 1336mzzm may include from about 50 weight percent to about 100 weight percent of the cis isomer and from about 0 weight percent to about 50 weight percent of the trans isomer; from about 75 weight percent to about 100 weight of the cis isomer and from about 0 weight percent to about 25 weight percent of the trans isomer; or from about 90 weight percent to about 100 weight percent of the cis isomer and from about 0 weight percent to about 10 weight percent of the trans isomer.

1-chloro-3,3,3-trifluoropropene can similarly be provided in any effective amount to achieve the desired effect discussed herein. In one embodiment, such an effective amount is from about 30 to about 95 mole percent. In further embodiments, such an effective amount is from about 30 to about 70 mole percent; about 40 to about 60 mole percent; or about 50 mole percent. While 1-chloro-3,3,3-trifluoropropene may be provided as any isomer or mixture of isomers, as defined herein, in one embodiment, the composition includes at least the trans isomer of 1233zd, which may be provided alone or in a mixture with the cis isomer. To this end, 1233zd may include from about 50 weight percent to about 100 weight percent of the trans isomer and from about 0 weight percent to about 50 weight percent of the cis isomer; from about 75 weight percent to about 100 weight percent of the trans isomer and from about 0 weight percent to about 25 weight percent of the cis isomer; or from about 90 weight percent to about 100 weight percent of the trans isomer and from about 0 weight percent to about 10 weight percent of the cis isomer.

In further embodiments of the blowing agent composition, the at least one adjuvant includes a co-blowing agent, which may include a hydrofluorocarbon (HFC) or hydrocarbon co-blowing agent. With respect to the former, HFC co-blowing agents may include one or more C1-C4 HFCs, such as, but not limited to, difluoromethane (HFC-32), fluoroethane (HFC-161), difluoroethane (HFC-152), trifluoroethane (HFC-143), tetrafluoroethane (HFC-134), pentafluoroethane (HFC-125), pentafluoropropane (HFC-245), hexafluoropropane (HFC-236), heptafluoropropane (HFC-227), pentafluorobutane (HFC-365), hexafluorobutane (HFC-356), all isomers of all of these, and combinations of two or more of these. With respect to the latter, such agents may include one or more C4-C6 hydrocarbons, such as, but are not limited to, isopentane, normal pentane, cyclopentane, butane and isobutane, and combinations of two or more of these.

Additional or alternative co-blowing agents that may be provided as an adjuvant include one or more of the following: water, $CO_2$, CFCs, HCCs, HCFCs, C1-C5 alcohols, C1-C4 aldehydes, C1-C4 ketones, C1-C4 ethers and diethers, organic acids, such as but not limited to formic acid, and combinations of two or more of these.

In further embodiments, the present invention also relates to a foamable composition including a foam forming agent and the blowing agent composition, as described herein. The blowing agent may be provided as a preblend, wherein one or more of the foregoing components are first preblended, then provided to the foamable composition. Alternatively, each component of the blowing agent composition may be separately provided to the foamable composition to form the blowing agent composition therewithin.

The foamable composition exhibits k-factor values that are considered advantageous. In one embodiment, the foamable composition exhibits an initial (measured within 24 hours of foam preparation) k-factor (BTU in/hr ft$^{2}$° F.) at 40° F. of not greater than about 0.14, and in certain embodiments, not greater than 0.138. In further embodiments, the foamable composition exhibits an initial k-factor (BTU in/hr ft$^{2}$° F.) at 75° F. of not greater than about 0.16, and in certain embodiments, not greater than 0.158. In even further embodiments, the foamable composition exhibits an initial k-factor (BTU in/hr ft$^{2}$° F.) at 110° F. of not greater than about 0.18, and in certain embodiments, not greater than 0.1772.

The present invention also relates to a foam premix composition including one or more polyols and the blowing agent composition, as described herein. Again, the blowing agent may be provided as a preblend, wherein one or more of the foregoing components are first preblended, then provided to the foam premix. Alternatively, each component of the blowing agent composition may be separately provided to the foam premix to form the blowing agent composition therewithin.

In further embodiments, the present invention also relates to a method of forming a foam by adding to a foamable and/or foaming composition the blowing agent composition described herein and reacting the foaming composition under conditions effective to form a cellular structure. While not limited thereto, the foamable composition may include isocyanate and one or more polyols. The foamable composition may also include at least one additional component selected from the group consisting of catalysts, surfactants, flame retardants, colorants, and combinations of these.

In further embodiments, the present invention relates to a foam including a plurality of polymeric cells and the blowing agent composition described herein. The foam exhibits k-factor values that are considered advantageous. In one embodiment, the foam exhibits an initial k-factor (BTU in/hr ft$^{2}$° F.) at 40° F. of not greater than about 0.14, and in certain embodiments, not greater than 0.138. In further embodiments, the foam exhibits an initial k-factor (BTU in/hr ft$^{2}$° F.) at 75° F. of not greater than about 0.16, and in certain embodiments, not greater than 0.158. In even further embodiments, the foam exhibits an initial k-factor (BTU in/hr ft$^{2}$° F.) at 110° F. of not greater than about 0.18, and in certain embodiments, not greater than 0.1772. While not limited thereto, such a foam may be a rigid foam, open cell foam, closed cell foam, flexible foam or an integral skin foam. It may also be a pray applied foam or a pour-in-place foam. It may also be incorporated into an article or otherwise in an article or apparatus, such as, but not limited to, a refrigerator or freezer.

Additional embodiments and advantages to the present invention will be readily apparent based on the disclosure provided herein.

DETAILED DESCRIPTION OF THE INVENTION

Figure 1:
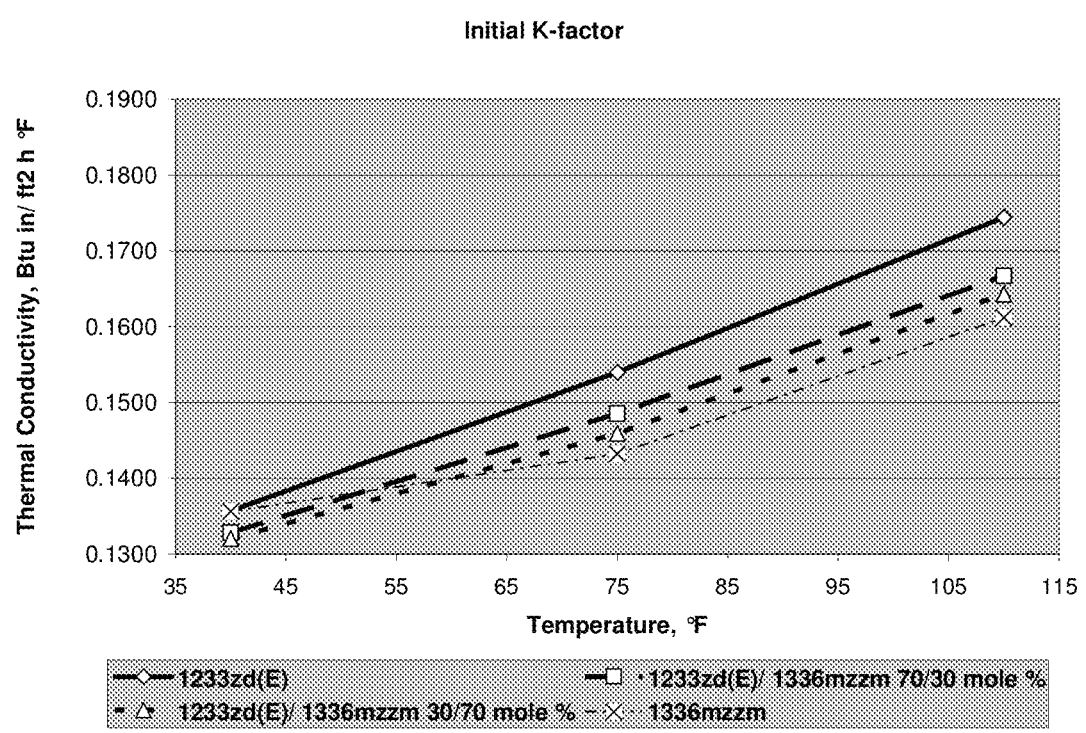
FIG. 1 illustrates a comparison of initial k-factors for 1,1,1,4,4,4-hexafluorobutene (1336mzzm), E-1-chloro-3,3,3-trifluoropropene (1233zd(E)), and blends of 1,1,1,4,4,4-hexafluorobutene (1336mzzm) and E-1-chloro-3,3,3-trifluoropropene (1233zd(E)).
Figure 2:
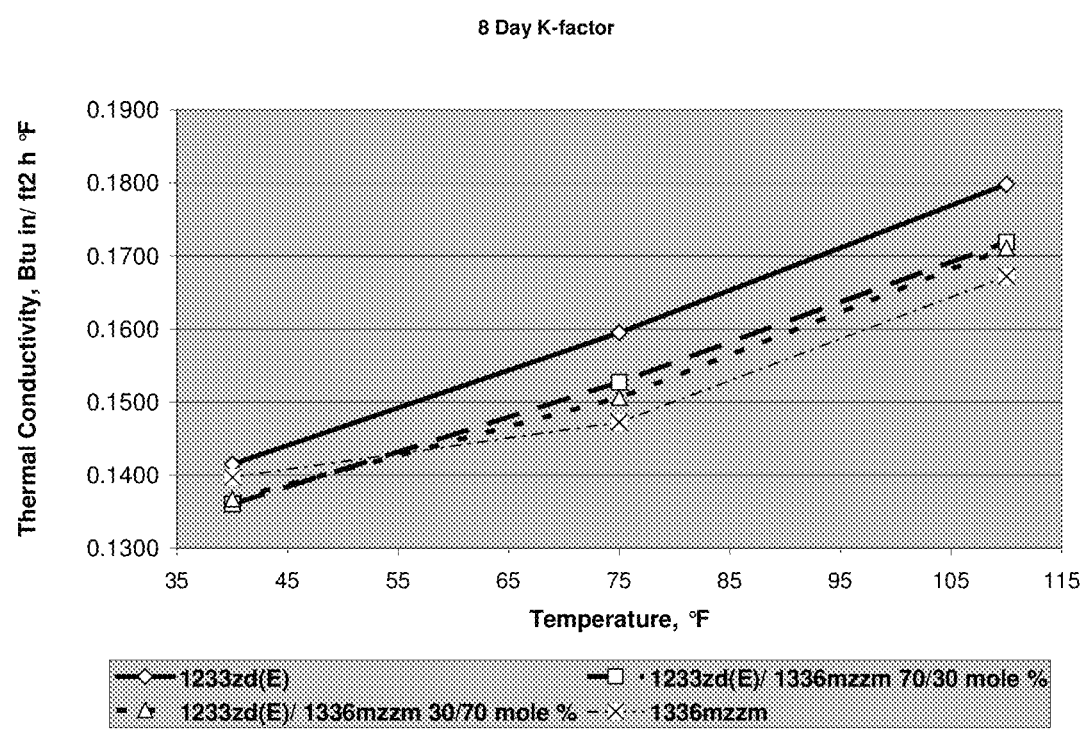
FIG. 2 illustrates a comparison for percent increase in k-factor after a 14 day aging period for 1,1,1,4,4,4-hexafluorobutene (1336mzzm), E-1-chloro-3,3,3-trifluoropropene (1233zd(E)), and blends of 1,1,1,4,4,4-hexafluorobutene (1336mzzm) and E-1-chloro-3,3,3-trifluoropropene (1233zd (E)).
Figure 3:
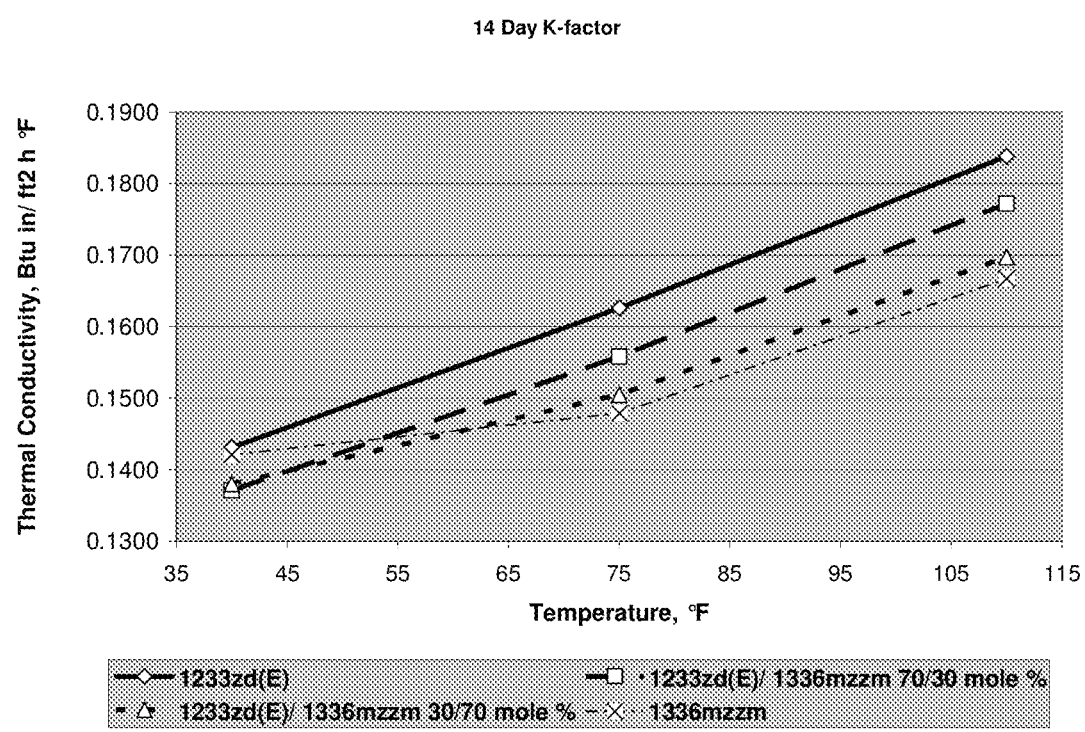
FIG. 3 illustrates a comparison of an 14 day k-factor for 1,1,1,4,4,4-hexafluorobutene (1336mzzm), E-1-chloro-3,3, 3-trifluoropropene (1233zd(E)), and blends of 1,1,1,4,4,4-hexafluorobutene (1336mzzm) and E-1-chloro-3,3,3-trifluoropropene (1233zd(E)).
Figure 4:
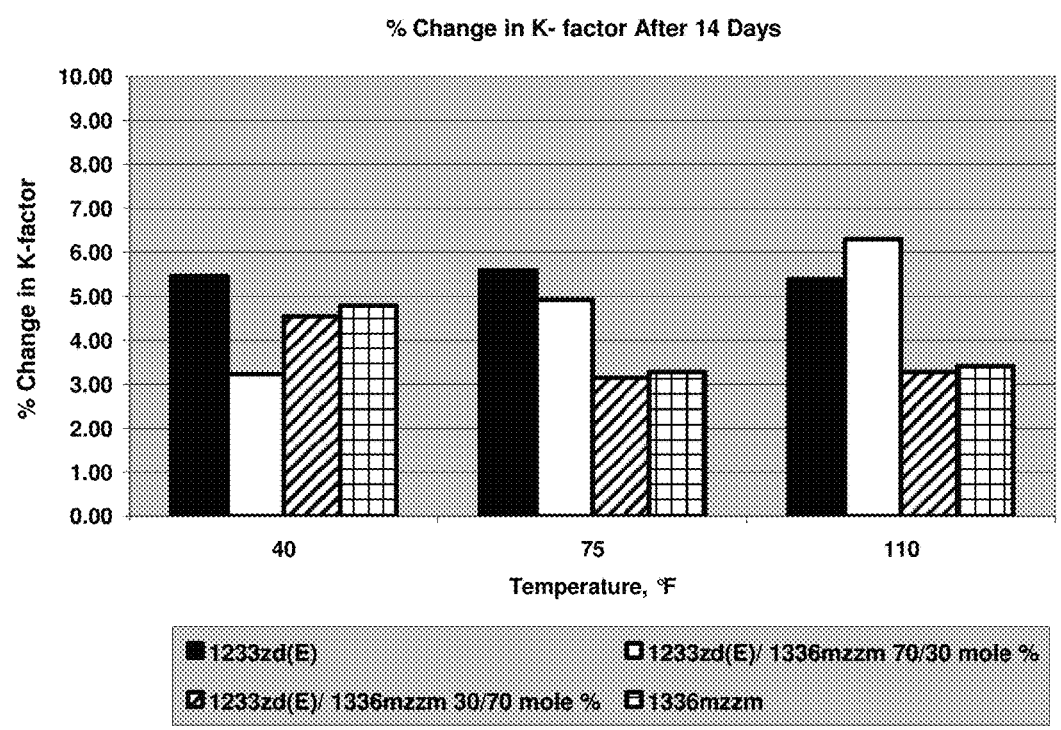
FIG. 4 illustrates a comparison of an 8 day k-factor for 1,1,1,4,4,4-hexafluorobutene (1336mzzm), E-1-chloro-3,3,3-trifluoropropene (1233zd(E)), and blends of 1,1,1,4,4,4-hexafluorobutene (1336mzzm) and E-1-chloro-3,3,3-trifluoropropene (1233zd(E)).

The invention relates to mixtures comprising, consisting essentially of or consisting of 1,1,1,4,4,4-hexafluorobutene (1336mzzm) and 1-chloro-3,3,3-trifluoropropene (1233zd). As noted above, the use of 1336mzzm does not meet all the ideal requirements of a blowing agent, most notably because of its boiling point, high molecular weight, and prohibitive cost of production. The present invention has surprising and unexpectedly found that the addition of 1233zd, particularly the trans isomer, as a co-blowing agent reduces the blowing agent cost but more importantly provides unexpected substantial improvement to the thermal performance of foams prepared with the blend.

As used herein the term "1,1,1,4,4,4-hexafluorobutene" or "1336mzzm" generally refers to either or both the cis- or trans-form. The terms "cis HFO-1336mzzm" and "trans HFO-1336mzzm" are used herein to describe the cis- and trans-forms of 1,1,1,4,4,4-hexafluorobutene, respectively. The terms "1,1,1,4,4,4-hexafluorobutene" or "1336mzzm" therefore include within its scope cisHFO-1336mzzm, transHFO-1336mzzm, and all combinations and mixtures of these. In preferred embodiments, 1336mzzm refers to the cis isomer. The present invention, however, is not limited thereto and may include only trans-1336mzzm or mixtures of the cis and trans isomers. In further embodiments, the 1336mzzm may include from about 50 weight percent to about 100 weight percent of the cis isomer and from about 0 weight percent to about 50 weight percent of the trans isomer; from about 75% weight percent to about 100 weight percent of the cis isomer and from about 0 weight percent and 25 weight percent of the trans isomer; or from about 90 weight percent to about 100 weight percent of the cis isomer and from about 0 weight percent to about 10 weight percent of the trans isomer. Such ranges for the composition of 1336mzzm are not necessarily limiting to the instant invention and may be also be provided in any effective amount to achieve the advantages provided herein.

As used herein the term "1-chloro-3,3,3-trifluoropropene" or "1233zd" generally refers to either or both the cis- or trans-form. The terms "cis HCFO-1233zd" and "trans HCFO-1233zd" are used herein to describe the cis- and trans-forms of 1,1,1-trifluo,3-chlororopropene, respectively. The terms "1-chloro-3,3,3-trifluoropropene" or "1233zd" therefore include within its scope cisHCFO-1233zd, transHCFO-1233zd, and all combinations and mixtures of these. In preferred embodiments, 1233zd refers to the trans isomer. The present invention, however, is not limited thereto and may include only cis-1233zd or mixtures of the cis and trans isomers. In further embodiments, the 1233zd may include from about 50 weight percent to about 100 weight percent of the trans isomer and from about 0 weight percent to about 50 weight percent of the cis isomer; from about 75 weight percent to about 100 weight percent of the trans isomer and from about 0 weight percent to about 25 weight percent of the cis isomer; or from about 90 weight percent to about 100 weight percent of the trans isomer and from about 0 weight percent to about 10 weight percent of the cis isomer. Such ranges for the composition of 1233zd are not necessarily limiting to the instant invention and may be also be provided in any effective amount to achieve the advantages provided herein.

The amount of 1336mzzm and 1233zd, contained in the present compositions can vary widely, depending the particular application, and compositions containing more than trace amounts and less than 100% of the compound are within broad the scope of the present invention. Moreover, the compositions of the present invention can be azeotropic, azeotrope-like or non-azeotropic. In certain embodiments, the compositions comprise from about 5 to about 70 mole percent 1336mzzm and from about 30 to about 95 mole percent 1233zd. In further non-limiting embodiments, the compositions comprise from about 30 to about 70 mole percent 1336mzzm and from about 30 to about 70 mole percent 1233zd; from about 40 to about 60 mole percent 1336mzzm and from about 40 to about 60 mole percent 1233zd; or about 50 mole percent 1336mzzm and about 50 mole percent 1233zd.

While the compositions of 1336mzzm and 1233zd may be provided as a blowing agent composition, additional components or adjuvants may be provided and include, but are not limited to co-blowing agent(s), polyol(s), surfactant(s), polymer modifier(s), colorant(s), dye(s), solubility enhancer(s), flammability suppressant(s), flame retardants(s), antibacterial agent(s), viscosity reduction modifier(s), filler(s), vapor pressure modifier(s), nucleating agent(s), catalyst(s) and combination of any two or more of these. Alternative co-blowing agents may also be provided.

In one embodiment, such co-blowing agents may include one or more hydrocarbons or hydrofluorocarbons (HFCs), particularly C4-C6 hydrocarbons or C1-C4 HFCs, that are known in the art. Examples of such HFC co-blowing agents include, but are not limited to, one or a combination of difluoromethane (HFC-32), fluoroethane (HFC-161), difluoroethane (HFC-152), trifluoroethane (HFC-143), tetrafluoroethane (HFC-134), pentafluoroethane (HFC-125), pentafluoropropane (HFC-245), hexafluoropropane (HFC-236), heptafluoropropane (HFC-227ea), pentafluorobutane (HFC-365), hexafluorobutane (HFC-356) and all isomers of all such HFC's. With respect to hydrocarbons, the present blowing agent compositions also may include in certain preferred embodiments, for example, iso, normal and/or cyclopentane for thermoset foams and butane or isobutane for thermoplastic foams. Other materials, such as water, $CO_2$, CFCs (such as trichlorofluoromethane (CFC-11) and dichlorodifluoromethane (CFC-12)), hydrochlorocarbons (HCCs such as dichloroethylene (preferably trans-dichloroethylene), ethyl chloride and chloropropane), HCFCs, C1-C5 alcohols (such as, for example, ethanol and/or propanol and/or butanol), C1-C4 aldehydes, C1-C4 ketones, C1-C4 ethers (including ethers (such as dimethyl ether and diethyl ether), diethers (such as dimethoxy methane and diethoxy methane)), and methyl formate, organic acids (such as but not limited to formic acid), including combinations of any of these may be included, although such components not necessarily preferred in many embodiments due to negative environmental impact. The relative amount of any of the above noted additional co-blowing agents, as well as any additional components which may be included in present compositions, can vary widely within the general broad scope of the present invention according to the particular application for the composition, and all such relative amounts are considered to be within the scope hereof.

One aspect of the present invention provides foamable compositions. As is known to those skilled in the art, foamable compositions generally include one or more components capable of forming foam. As used herein, the term "foam forming agent" is used to refer to a component, or a combination on components, which are capable of forming a foam structure, preferably a generally cellular foam structure. The foamable compositions of the present invention include such component(s) and a blowing agent blend, e.g. a blend including at least 1336mzzm and 1233zd.

Foams and foamable compositions of the instant invention relate generally to all foams, (including but not limited to closed cell foam, open cell foam, rigid foam, flexible foam, integral skin and the like), prepared from a foam formulation containing a blowing agent composition of the invention. Applicants have found that one advantage of the foams is the ability to achieve exceptional thermal performance under low temperature conditions, as evidence from the k-factor data provided herein. Although it is contemplated that the present foams may be used in a wide variety of applications, in certain preferred embodiments the present invention comprises appliance foams in accordance with the present invention, including refrigerator foams, freezer foams, refrigerator/freezer foams, panel foams, and other cold or cryogenic manufacturing applications.

In certain embodiments, the one or more components capable of forming foam comprise a thermosetting composition capable of forming foam and/or foamable compositions. Examples of thermosetting compositions include polyurethane and polyisocyanurate foam compositions, and also phenolic foam compositions. This reaction and foaming process may be enhanced through the use of various additives such as catalysts and surfactant materials that serve to control and adjust cell size and to stabilize the foam structure during formation. Furthermore, is contemplated that any one or more of the additional components described above with respect to the blowing agent compositions of the present invention could be incorporated into the foamable composition of the present invention. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

With respect to the preparation of rigid or flexible polyurethane or polyisocyanurate foams using the foregoing as the blowing agent, any of the methods well known in the art can be employed. See Saunders and Frisch, Volumes I and II Polyurethanes Chemistry and Technology (1962). In general, polyurethane or polyisocyanurate foams are prepared by combining an isocyanate, a polyol or mixture of polyols, a blowing agent or mixture of blowing agents, and other materials such as catalysts, surfactants, and optionally, flame retardants, colorants, or other additives.

It is convenient, though not exclusive, in many applications to provide the components for polyurethane or polyisocyanurate foams in pre-blended foam formulations. Most typically, the foam formulation is pre-blended into two components. The isocyanate or polyisocyanate composition comprises the first component, commonly referred to as the "A" component. The polyol or polyol mixture, surfactant, catalysts, blowing agents, flame retardant, and other isocyanate reactive components comprise the second component, commonly referred to as the "B" component. While the surfactant, catalyst(s) and blowing agent composition are usually placed on the polyol side, they may be placed on either side, or partly on one side and partly on the other side. Accordingly, polyurethane or polyisocyanurate foams are readily prepared by bringing together the A and B side components either by hand mix, for small preparations, or preferably machine mix techniques to form blocks, slabs, laminates, pour-in-place panels and other items, spray applied foams, froths, and the like. Optionally, other ingredients such as fire retardant, colorants, auxiliary blowing agents, water, and even other polyols can be added as a third stream to the mix head or reaction site. Most conveniently, however, they are all incorporated into one B component.

Any organic polyisocyanate can be employed in polyurethane or polyisocyanurate foam synthesis inclusive of aliphatic and aromatic polyisocyanates. Preferred, as a class is the aromatic polyisocyanates. Preferred polyisocyanates for rigid polyurethane or polyisocyanurate foam synthesis are the polymethylene polyphenyl isocyanates, particularly the mixtures containing from about 30 to about 85 percent by weight of methylenebis(phenyl isocyanate) with the remainder of the mixture comprising the polymethylene polyphenyl polyisocyanates of functionality higher than 2. Preferred polyisocyanates for flexible polyurethane foam synthesis are toluene diisocyanates including, without limitation, 2,4-toluene diisocyanate, 2,6-toluene diisocyanate, and mixtures thereof.

Typical polyols used in the manufacture of rigid polyurethane foams include, but are not limited to, aromatic amino-based polyether polyols such as those based on mixtures of 2,4- and 2,6-toluenediamine condensed with ethylene oxide and/or propylene oxide. These polyols find utility in pour-in-place molded foams. Another example is aromatic alkylamino-based polyether polyols such as those based on ethoxylated and/or propoxylated aminoethylated nonylphenol derivatives. These polyols generally find utility in spray applied polyurethane foams, though such use is not considered limiting to the invention and may be adapted as otherwise understood in the art or provided herein. Another example is sucrose-based polyols such as those based on sucrose derivatives and/or mixtures of sucrose and glycerine derivatives condensed with ethylene oxide and/or propylene oxide. These polyols generally find utility in pour-in-place molded foams, again such use is not considered limiting to the invention and may be adapted as otherwise understood in the art or provided herein.

Typical polyols used in the manufacture of flexible polyurethane foams include, but are not limited to, those based on glycerol, ethylene glycol, trimethylolpropane, ethylene diamine, pentaerythritol, and the like condensed with ethylene oxide, propylene oxide, butylene oxide, and the like. These are generally referred to as "polyether polyols". Another example is the graft copolymer polyols, which include, but are not limited to, conventional polyether polyols with vinyl polymer grafted to the polyether polyol chain. Yet another example is polyurea modified polyols which consist of conventional polyether polyols with polyurea particles dispersed in the polyol.

Examples of polyols used in polyurethane modified polyisocyanurate foams include, but are not limited to, aromatic polyester polyols such as those based on complex mixtures of phthalate-type or terephthalate-type esters formed from polyols such as ethylene glycol, diethylene glycol, or propylene glycol. These polyols are used in rigid laminated boardstock, and may be blended with other types of polyols such as sucrose-based polyols, and used in polyurethane foam applications.

Catalysts used in the manufacture of polyurethane foams are typically tertiary amines including, but not limited to, N-alkylmorpholines, N-alkylalkanolamines, N,N-dialkylcyclohexylamines, and alkylamines where the alkyl groups are methyl, ethyl, propyl, butyl and the like and isomeric forms thereof, as well as heterocyclic amines. Typical, but not limiting, examples are triethylenediamine, tetramnethylethylenediamine, bis(2-dimethylaminoethyl)ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and mixtures thereof.

Optionally, non-amine polyurethane catalysts are used. Typical of such catalysts are organometallic compounds of lead, tin, titanium, antimony, cobalt, aluminum, mercury, zinc, nickel, copper, manganese, zirconium, bismuth, and mixtures thereof. Exemplary catalysts include, without limitation, lead 2-ethylhexoate, lead benzoate, ferric chloride, antimony trichloride, and antimony glycolate. A preferred organo-tin class includes the stannous salts of carboxylic acids such as stannous octoate, stannous 2-ethylhexoate, stannous laurate, and the like, as well as dialkyl tin salts of carboxylic acids such as dibutyl tin diacetate, dibutyl tin dilaurate, dioctyl tin diacetate, and the like.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art including, but not limited to, glycine salts and tertiary amine trimerization catalysts, alkali metal carboxylic acid salts, and mixtures thereof. Preferred species within the classes are potassium acetate, potassium octoate, and N-(2-hydroxy-5-nonylphenol)methyl-N-methylglycinate.

Dispersing agents, cell stabilizers, and surfactants may be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458.

Other optional additives for the blowing agent mixture may include flame retardants such as tris(2-chloroethyl) phosphate, tris (2-chloropropyl) phosphate, tris (2,3-dibromopropyl) phosphate, tris (1,3-dichloropropyl) phosphate, diammonium phosphate, various halogenated aromatic compounds, antimony oxide, aluminum trihydrate, polyvinyl chloride, and the like. Other optional ingredients may include from 0 to about 3 percent water, which chemically reacts with the isocyanate to produce carbon dioxide. The carbon dioxide acts as an auxiliary-blowing agent.

Generally speaking, the amount of the blowing agent composition present in the blended mixture is dictated by the desired foam densities of the final polyurethane or polyisocyanurate foams products. The polyurethane foams produced can vary in density from about 0.5 pound per cubic foot to about 40 pounds per cubic foot, preferably from about 1.0 to about 20.0 pounds per cubic foot, and most preferably from about 1.5 to about 6.0 pounds per cubic foot for rigid polyurethane foams and from about 1.0 to about 4.0 pounds per cubic foot for flexible foams. The density obtained is a function of how much of the blowing agent, or blowing agent mixture, is present in the A and/or B components, or that is added at the time the foam is prepared.

In another embodiment, the mixtures and compositions of this invention may be used as propellants in sprayable compositions, either alone or in combination with known propellants. The sprayable composition comprises, consists essentially of, and consists of a material to be sprayed and a propellant comprising, consisting essentially of, and consisting of a mixture or composition of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications and metered dose inhalers (MDIs).

The compositions of the invention may also be used in a method of dissolving a contaminant or removing a contaminant from the surface of a substrate that comprises, consists essentially of, and consists of the step of contacting the substrate with the compositions of the present invention.

The foams in accordance with the present invention, in certain preferred embodiments, provide one or more exceptional features, characteristics and/or properties, including: thermal insulation efficiency (particularly for thermoset foams), dimensional stability, compressive strength, aging of thermal insulation properties, all in addition to the low ozone depletion potential and low global warming potential associated with many of the preferred blowing agents of the present invention. In certain highly preferred embodiments, the present invention provides thermoset foam, including such foam formed into foam articles, which exhibit improved thermal conductivity relative to foams made using the same blowing agent (or a commonly used blowing agent HFC-245fa) in the same amount but without the blowing agent composition of the present invention. In certain highly preferred embodiments, the thermoset foams, and preferably polyurethane foams, of the present invention exhibit an initial k-factor (BTU in/hr $ft^{2}°$ F.) at 40° F. of not greater than about 0.14, more preferably not greater than 0.138. Furthermore, in certain embodiments, it is preferred that the thermoset foams, and preferably the polyurethane foams of the present invention exhibit an initial k-factor (BTU in/hr ft$^{2\circ}$ F.) at 75° F. of not greater than about 0.16, more preferably not greater than 0.158. In even further embodiments, it is preferred that the thermoset foams, and preferably the polyurethane foams of the present invention exhibit an initial k-factor (BTU in/hr ft$^{2\circ}$ F.) at 110° F. of not greater than about 0.18, more preferably not greater than 0.1772.

The following examples are provided for the purpose of illustrating the present invention but without limiting the scope thereof.

EXAMPLES

Foams with 1336mzzm, 1233zd(E), 30/70 mole % blend of 1233zd(E)/1336mzzm and 70/30 mole % blend of 1233zd (E)/1336mzzm as blowing agent were prepared. The polyol master batch composition is shown in Table 1 while the generic spray foam formulations with corresponding amounts of blowing agents are listed in Table 2. The foams were prepared with and 3 second pour time and 8 second mix time. The raw materials temperatures were 50° F. polyol/70° F. MDI.

TABLE 1

Polyol Master Batch Composition

| Component | Lot Numbers | php |
|---|---|---|
| Manich polyether polyol, OH 470 | VC03019501 | 50.00 |
| Aromatic polyester polyol | MY4020-18 | 43.75 |
| Diethylene glycol | B11+024 | 6.25 |
| Silicone surfactant | 0001580875 | 1.25 |
| Dimethyl ethanol amine | 258009 | 2.00 |
| Neutral chlorinated phosphate ester | 122 | 12.50 |
| Water |  | 1.25 |
| Total |  | 117.00 |

TABLE 2

Generic Spray Foam Formulations

|  | 1233zd(E) | 1233zd(E)/ 1336mzzm 70/30 mole % | 1233zd(E)/ 1336mzzm 30/70 mole % | 1336mzzm |
|---|---|---|---|---|
| Mol. % of 1336mzzm | 0 | 30 | 70 | 100 |
| Mol. % of 1233zd(E) | 100 | 70 | 30 | 0 |
| Moles of 1336mzzm | 0 | 0.061 | 0.143 | 0.204 |
| Moles of 1233zd(E) | 0.204 | 0.143 | 0.061 | 0 |
| Polyol Blend |  |  |  |  |
| Master Batch | 117.0 | 117.0 | 117.0 | 117.0 |
| 1336mzzm | 0 | 10.0 | 23.5 | 33.5 |
| 1233zd(E) | 26.5 | 18.6 | 7.9 | 0 |
| Total Isocyanate | 143.5 | 145.6 | 148.4 | 150.5 |
| Polymeric MDI (NCO 31.5 wt. %) | 137.38 | 137.38 | 137.38 | 137.38 |
| NCO Index | 110 | 110 | 110 | 110 |

Physical Properties—Reactivity

The relationship between cream time, gel time and tack free time are anticipated. They are equivalent for all foams prepared.

TABLE 3

Foam Reactivity

|  | 1233zd(E) 10-24-1 | 1233zd(E)/ 1336mzzm 70/30 mole % 10-24-3 | 1233zd(E)/ 1336mzzm 30/70 mole % 10-24-2 | 1336mzzm 10-23-2 |
|---|---|---|---|---|
| Reactivity, second |  |  |  |  |
| Cream Time | 15 | 15 | 12 | 12 |
| Gel Time | 35 | 34 | 33 | 38 |
| Tack-Free Time | 45 | 45 | 44 | 48 |

The foams prepared were well mixed and equivalent in quality. The block density of the foams produced is similar as is the ratio of block to core density. This is anticipated since the foams were prepared with equivalent moles of blowing agents.

TABLE 4

Foam Quality: Density

|  | 1233zd(E) 10-24-1 | 1233zd(E)/ 1336mzzm 70/30 mole % 10-24-3 | 1233zd(E)/ 1336mzzm 30/70 mole % 10-24-2 | 1336mzzm 10-23-2 |
|---|---|---|---|---|
| Density, lb/ft$^3$ |  |  |  |  |
| Foam Density - Block* | 1.8 | 1.78 | 1.81 | 1.79 |
| Foam Density - Core* | 1.83 | 1.71 | 1.77 | 1.82 |
| Ratio Block/Core Density | 0.98 | 1.04 | 1.02 | 0.98 |

*Block density is density of the squared foam prior to sample cutting. Core density is density of the k-factor sample taken from the middle of the sample Thermal Conductivity Initially, foam produced with 1336mzzm show the non-linear curve shape normally found with high boiling blowing agents. This is attributed to the condensation of the blowing agent in the foam matrix at temperatures below the boiling point of the blowing agent. It is unanticipated that the 30/70 mole % 1336mzzm/1233zd(E) and 70/30 mole % 1336mzzm/1233zd(E) blend does not show the same curve shape since this is not an azeotropic composition. In addition the thermal conductivity of foams prepared with these blends are significantly improved over those made with 1233zd(E). Not only are they improved, the improvement is nonlinear in relationship to the amount of 1336mzzm added to the blowing agent blend. It is particularly interesting that the improvement at the low mean temperatures is significant and not 1233zd(E) concentration dependant. In addition, it is notable that the foam prepared from the blends age slower than the 1233zd(E) and the 1336mzzm foams.

TABLE 5

Foam Thermal Conductivity

|  | 1233zd(E) 10-24-1 | 1233zd(E)/ 1336mzzm 70/30 mole % 10-24-3 | 1233zd(E)/ 1336mzzm 30/70 mole % 10-24-2 | 1336mzzm 10-23-2 |
|---|---|---|---|---|
| Initial |  |  |  |  |
| 40° F. | 0.1357 | 0.1328 | 0.1320 | 0.1356 |
| 75° F. | 0.1540 | 0.1485 | 0.1459 | 0.1432 |
| 110° F. | 0.1744 | 0.1667 | 0.1643 | 0.1612 |
| 8 Day |  |  |  |  |
| 40° F. | 0.1415 | 0.1360 | 0.1367 | 0.1397 |
| 75° F. | 0.1595 | 0.1527 | 0.1506 | 0.1472 |
| 110° F. | 0.1798 | 0.1719 | 0.1711 | 0.1672 |
| 14 Day |  |  |  |  |
| 40° F. | 0.1431 | 0.1371 | 0.1380 | 0.1421 |
| 75° F. | 0.1626 | 0.1558 | 0.1505 | 0.1479 |
| 110° F. | 0.1838 | 0.1772 | 0.1697 | 0.1667 |

What is claimed is:

1. A thermal insulating thermoset foam, said foam comprising phenolic or resole resin forming closed cells and a blowing agent composition contained in said closed cells, said blowing agent composition comprising:
   from about 30 mole % to about 70 mole % 1,1,1,4,4,4-hexafluorobutene (1336mzzm);
   from about 30 mole % to about 70 mole % 1-chloro-3,3,3-trifluoropropene (1233zd); and
   optionally at least one adjuvant selected from the group consisting of co-blowing agent(s), polyol(s), surfactant(s), polymer modifier(s), colorant(s), dye(s), solubility enhancer(s), flammability suppressant(s), flame retardants(s), antibacterial agent(s), viscosity reduction modifier(s), filler(s), vapor pressure modifier(s), nucleating agent(s), catalyst(s) and combination of any two or more of these.

2. The thermal insulating thermoset foam of claim 1 wherein said 1-chloro-3,3,3-trifluoropropene (1233zd) comprises from about 50 weight percent to about 100 weight percent trans-1-chloro-3,3,3-trifluoropropene and from about 0 weight percent to about 50 weight percent cis-1-chloro-3,3,3-trifluoropropene.

3. The thermal insulating thermoset foam of claim 1 wherein said 1-chloro-3,3,3-trifluoropropene (1233zd) comprises from about 90 weight percent to about 100 weight percent trans-1-chloro-3,3,3-trifluoropropene and from about 0 weight percent to about 10 weight percent cis-1-chloro-3,3,3-trifluoropropene.

4. The thermal insulating thermoset foam of claim 1 wherein said 1,1,1,4,4,4-hexafluorobutene (1336mzzm) comprises from about 90 weight percent to about 100 weight percent cis 1,1,1,4,4,4-hexafluorobutene and from about 0 weight percent to about 10 weight percent trans-1,1,1,4,4,4-hexafluorobutene.

5. The thermal insulating thermoset foam of claim 1 wherein said 1,1,1,4,4,4-hexafluorobutene is provided in an amount from about 40 to about 60 mole percent and said 1-chloro-3,3,3-trifluoropropene is provided in an amount from about 40 to about 60 mole percent.

6. The thermal insulating thermoset foam of claim 1 wherein said at least one adjuvant comprises at least one co-blowing agent comprising one or more HFCs selected from the group consisting of difluoromethane (HFC-32), fluoroethane (HFC-161)difluoroethane (HFC-152), trifluoroethane (HFC-143), tetrafluoroethane (HFC-134), pentafluoroethane (HFC-125), pentafluoropropane (HFC-245), hexafluoropropane (HFC-236), heptafluoropropane (HFC-227), pentafluorobutane (HFC-365), hexafluorobutane (HFC-356), all isomers of all of these, and combinations of two or more of these.

7. The thermal insulating thermoset foam of claim 1 wherein said at least one adjuvant comprises at least one co-blowing agent comprising one or more hydrocarbons selected from the group consisting of isopentane, normal pentane, cyclopentane, butane and isobutane, and combinations of two or more of these.

8. The thermal insulating thermoset foam of claim 1 wherein said adjuvant comprises at least one co-blowing agent selected from the group consisting of water, $CO_2$, CFCs, HCCs, HCFCs, C1-C5 alcohols, C1-C4 aldehydes, C1-C4 ketones, C1-C4 ethers and diethers, organic acids, and combinations of two or more of these.

9. The thermal insulating thermoset foam of claim 1 wherein said adjuvant comprises water as at least one co-blowing agent.

10. The thermal insulating thermoset foam of claim 1 wherein the foam exhibits an initial k-factor (BTU in/hr ft$^{2\circ}$ F.) at 40° F. of not greater than about 0.14.

11. The thermal insulating thermoset foam of claim 1 wherein the foam exhibits an initial k-factor (BTU in/hr ft$^{2\circ}$ F.) at 75° F. of not greater than about 0.16.

12. The thermal insulating thermoset foam of claim 1 wherein the foam exhibits an initial k-factor (BTU in/hr ft$^{2\circ}$ F.) at 110° F. of not greater than about 0.18.

13. The foam of claim 3 wherein the foam exhibits an initial k-factor (BTU in/hr ft$^{2\circ}$ F.) at 75° F. of not greater than about 0.16.

14. The foam of claim 3 wherein the foam exhibits an initial k-factor (BTU in/hr ft$^{2\circ}$ F.) at 110° F. of not greater than about 0.18.

15. An appliance comprising the foam of claim 1.

16. The appliance of claim 15 wherein said foam is a refrigerator foam.

17. The appliance of claim 15 wherein said foam is a freezer foam.

18. The appliance of claim 15 wherein said foam is a panel foam.

* * * * *